United States Patent
Tsuruta et al.

(10) Patent No.: US 7,367,419 B2
(45) Date of Patent: May 6, 2008

(54) OXYGEN CONCENTRATION SENSOR FOR A SADDLE RIDE TYPE ALL-TERRAIN VEHICLE

(75) Inventors: Yuichiro Tsuruta, Wako (JP); Atsushi Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 11/011,777

(22) Filed: Dec. 15, 2004

(65) Prior Publication Data
US 2005/0150707 A1  Jul. 14, 2005

(30) Foreign Application Priority Data
Dec. 16, 2003  (JP)  ............................. 2003-417939

(51) Int. Cl.
*B60K 13/04* (2006.01)
(52) U.S. Cl. ....................... 180/309; 180/89.2; 180/296
(58) Field of Classification Search ................ 180/309, 180/89.2, 296, 291; 60/302
See application file for complete search history.

(56) References Cited

U.S. PATENT DOCUMENTS

| | | | | |
|---|---|---|---|---|
| 3,061,416 A | * | 10/1962 | Kazokas | ..................... 422/176 |
| 5,267,163 A | * | 11/1993 | Yoshida et al. | ............. 701/104 |
| 5,521,339 A | * | 5/1996 | Despain et al. | ............. 181/230 |
| 5,992,380 A | * | 11/1999 | Inagaki | ................... 123/339.11 |
| 6,293,095 B1 | * | 9/2001 | Yamamoto et al. | ........... 60/286 |
| 6,622,482 B2 | * | 9/2003 | Knight et al. | ................. 60/299 |
| 6,651,773 B1 | * | 11/2003 | Marocco | ..................... 181/270 |
| 6,719,084 B2 | * | 4/2004 | Kuji et al. | ................... 180/309 |
| 6,920,949 B2 | * | 7/2005 | Matsuura et al. | .......... 180/68.2 |
| 6,928,988 B2 | * | 8/2005 | Nishigaki | .................... 123/481 |
| 2003/0061860 A1 | * | 4/2003 | Hu et al. | ................... 73/23.31 |

FOREIGN PATENT DOCUMENTS

JP          6-280634          10/1994

* cited by examiner

*Primary Examiner*—Christopher P. Ellis
*Assistant Examiner*—John D Walters
(74) *Attorney, Agent, or Firm*—Westerman, Hattori, Daniels & Adrian, LLP

(57) ABSTRACT

A saddle ride type all-terrain vehicle includes an engine, a front wheel and rear wheels, a saddle type rider's seat, and a rear fender provided so as to cover the surroundings of the saddle type rider's seat and the rear wheels. The vehicle further includes an exhaust pipe led out to the vehicle body rear side from the engine, a muffler connected to the exhaust pipe, and an oxygen concentration sensor provided in the vicinity of a connection portion between the exhaust pipe and the muffler, wherein the oxygen concentration sensor is located inside the rear fender.

9 Claims, 5 Drawing Sheets

OXYGEN CONCENTRATION SENSOR FOR A SADDLE RIDE TYPE ALL-TERRAIN VEHICLE

FIELD OF THE INVENTION

The present invention relates to a saddle ride type all-terrain vehicle; particularly to a saddle ride type all-terrain vehicle including an oxygen concentration sensor for controlling the combustion in an engine.

BACKGROUND OF THE INVENTION

Conventionally, in a vehicle having a fuel injection system, the concentration of oxygen in the exhaust gas is detected, and the combustion in the engine is controlled based on the detection results.

Such is disclosed, for instance, in Japanese Patent Laid-open No. Hei 6-280634, wherein an oxygen concentration sensor is provided in each of the exhaust pipes that lead out from the lower side of the engine to the left and right sides of the vehicle body. The exhaust pipes disclosed in this publication extend rearward to connect to the muffler, which is disposed at a rear portion of the vehicle body, and the oxygen concentration sensor is disposed at an intermediate portion of the exhaust pipe extending to the muffler.

In the case of such a structure adapted for a saddle ride type all-terrain vehicle (hereinafter referred to as "ATV"), i.e., the structure in which the oxygen concentration sensor is provided at an intermediate portion of the exhaust pipe, the influences exerted on the exhaust pipe and the oxygen concentration sensor by mud and/or water on the road surface are great. In view of the characteristic of the ATV, that it often travels on off-road terrain, such factors must be taken into account.

Thus, the oxygen concentration sensor provided so as to project from the exhaust pipe disposed at a side portion of the vehicle body must be provided while taking into account the restrictions it will exert on the living-comfort properties (ride comfort) for the rider as well as the influences exerted thereon by external forces. It is therefore an object of the present invention to satisfy such demands.

SUMMARY OF THE INVENTION

The present invention addresses the above described conditions, and an object of the present invention is to provide a layout of an oxygen concentration sensor which ensures that living-comfort properties (ride comfort) can be secured and that the oxygen concentration sensor is less likely to be influenced by external forces.

According to the present invention, in order to attain the above objects, a first aspect of the present invention provides an ATV which includes an engine, a front wheel and rear wheels, a saddle type rider's seat, and a rear fender provided so as to cover the surroundings of the saddle type rider's seat and the rear wheels, wherein the ATV further includes an exhaust pipe leading out to the vehicle body rear side from the engine, a muffler connected to the exhaust pipe, and an oxygen concentration sensor provided in the vicinity of the connection portion of the exhaust pipe for connection with the muffler, such that when installed the oxygen concentration sensor has a sensing end projecting into the stream of exhaust gases and an opposing end extending outwardly. In order to attain the above objects, the oxygen concentration sensor is located inside the rear fender.

In a second aspect of the present invention, the ATV includes a catalyst provided in the muffler, and the oxygen concentration sensor is disposed immediately on the upstream side of the catalyst.

In a third aspect of the present invention, a foot rest for supporting the rider's feet is provided on the front side of an outside portion of the rear fender of the ATV.

According to the first and second aspects of the present invention, the oxygen concentration sensor is so provided as to be located inside the rear fender and is therefore not projecting the outside, so that good living-comfort properties for the rider can be secured, and so that the oxygen concentration sensor can be prevented from being easily influenced by external forces. Moreover, according to the third aspect, the oxygen concentration sensor is so disposed as not to project to the upper side of the foot rest located on the front side of the rear fender and, hence, not to interfere with the foot rest. Accordingly, the foot rest can be used as a large-room area.

Thus, according to the present invention, it is possible to both maintain favorable living-comfort properties of the vehicle for the rider, and prevent the exhaust pipe and the oxygen concentration sensor from being influenced by water and/or mud, by, in part, disposing the exhaust pipe and the oxygen concentration sensor away from the road surface on which the ATV navigates.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the invention will be described hereinafter with reference to the accompanying drawings.

Figure 1:
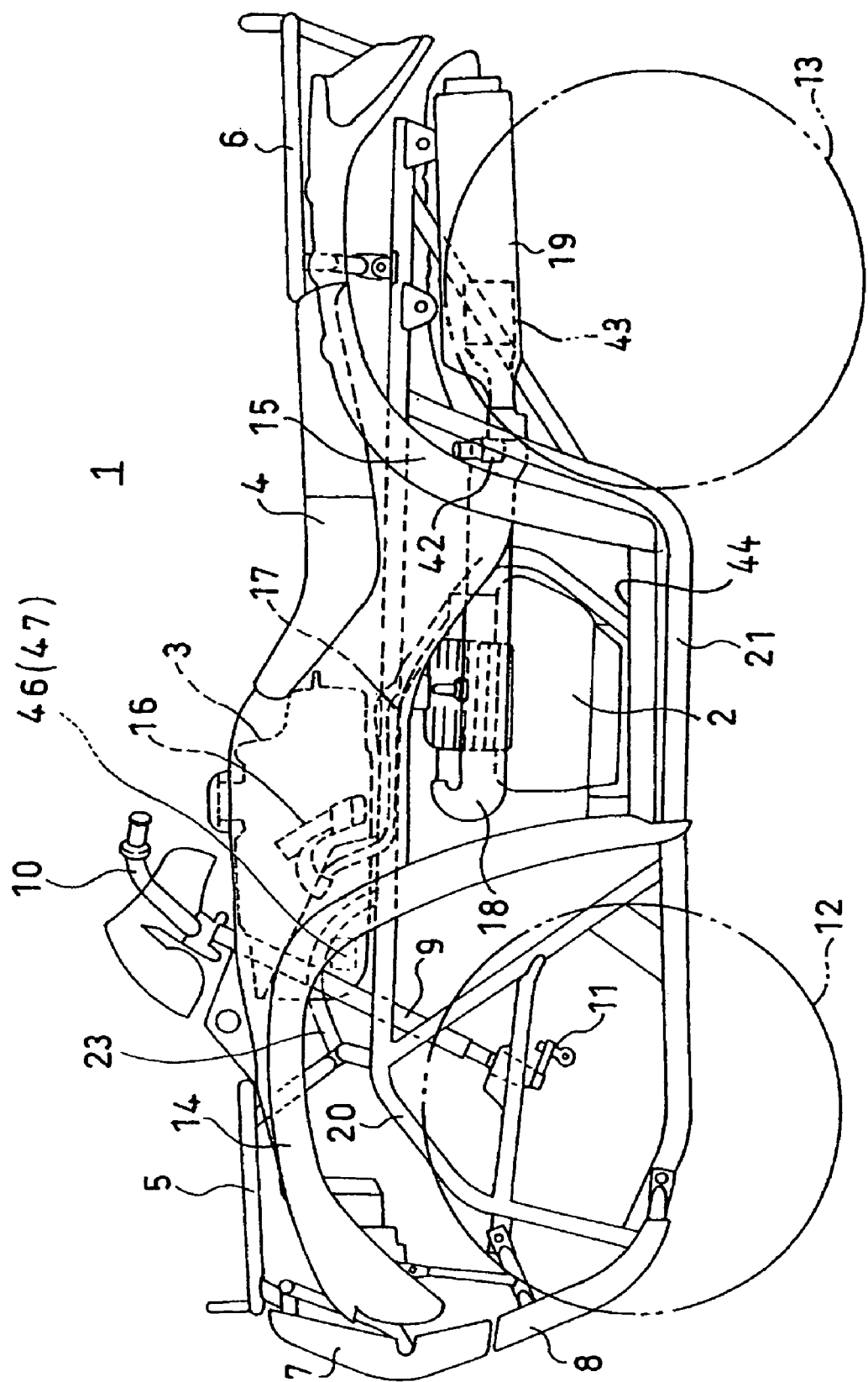
FIG. 1 is a left side view of an ATV according to one embodiment of the present invention.
Figure 2:
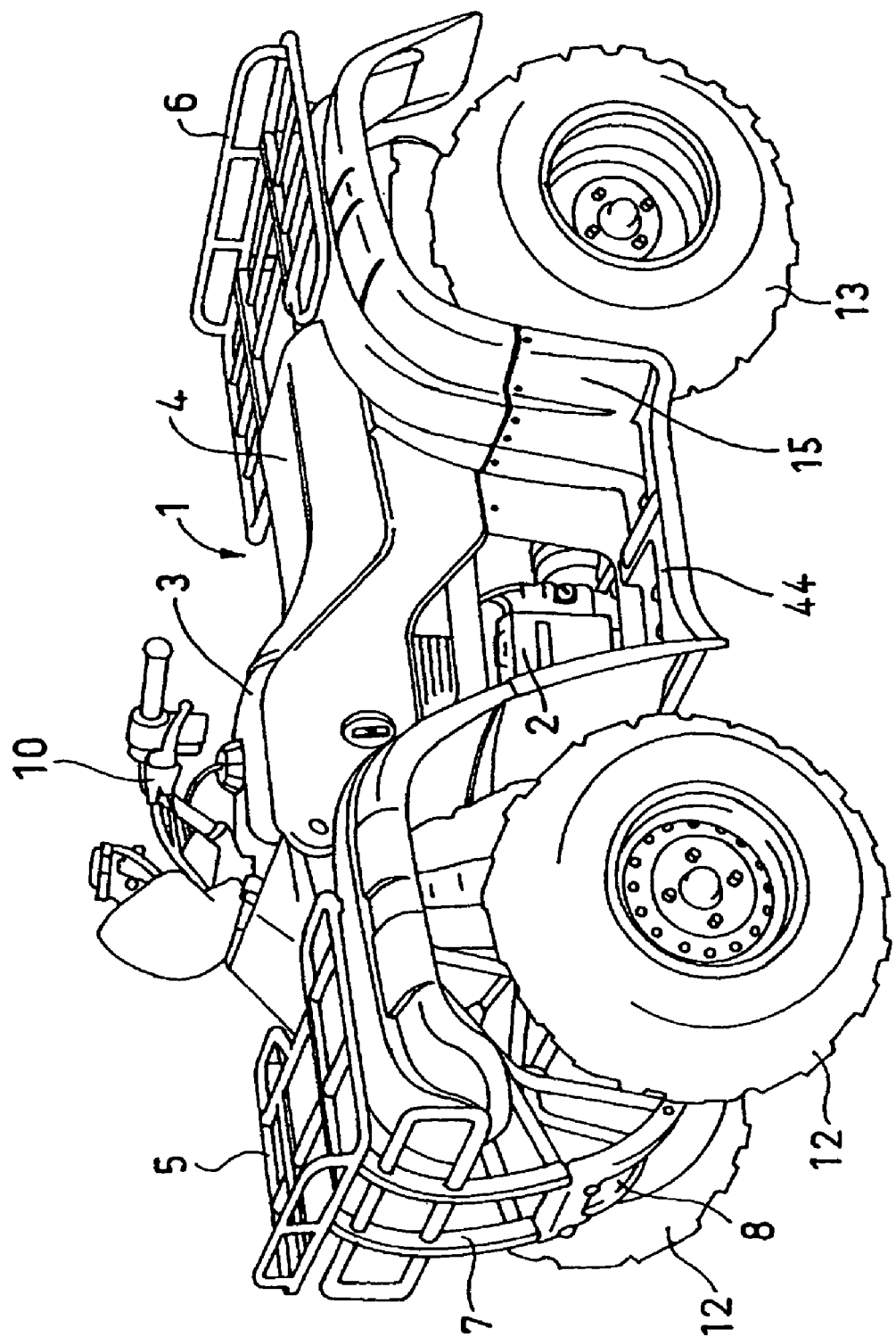
FIG. 2 is a perspective view of the ATV according to one embodiment of the present invention.
Figure 3:
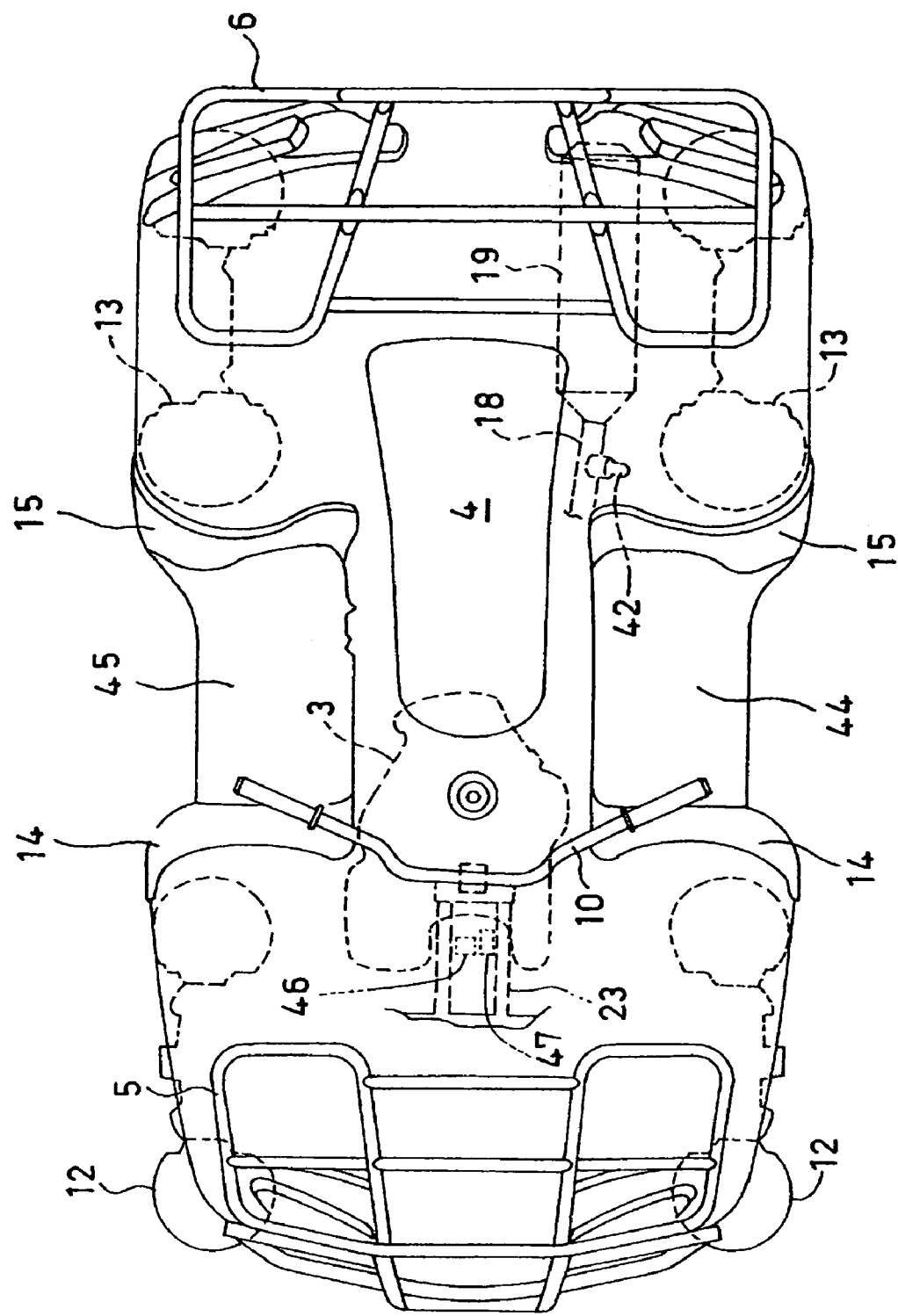
FIG. 3 is a plan view of the ATV according to one embodiment of the present invention.
Figure 4:
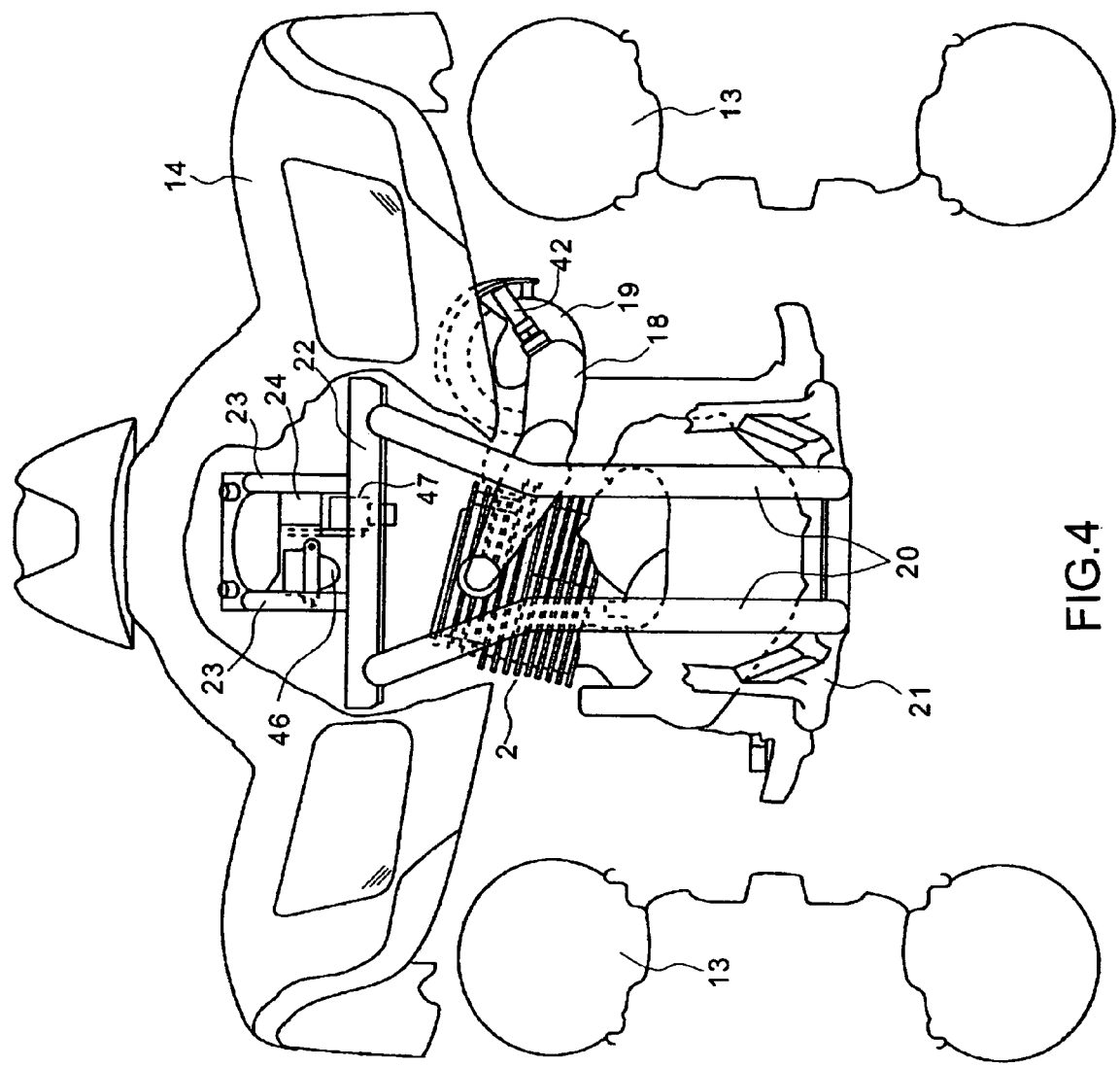
FIG. 4 is a front view of an essential part of the ATV according to one embodiment of the present invention.

In FIG. 1-5, the ATV 1 includes an engine 2 located at a central portion of the vehicle body, a fuel tank 3 located on the upper side of the engine 2, a rider's seat 4, front and rear luggage carriers 5 and 6, a front guard 7 and an under guard 8 located at the frontmost end of the vehicle. As depicted in FIG. 3, a front portion of the fuel tank 3 is recessed toward the vehicle rear side, and a steering shaft 9 is provided extending vertically through the portion of the recess. The presence of the recess prevents interference between the fuel tank 3 and the steering shaft 9, and enables the fuel tank 3 to be expanded to the vehicle front side. In addition, as will be described later, a tumble sensor can be provided in the space formed by the recess, and the influences of external forces on the tumble sensor can be reduced by the fuel tank 3.

A steering handle 10 is provided at an upper portion of the steering shaft 9, and a link 11 is provided at a lower portion of the steering shaft 9. The link 11 is connected to a front wheel 12 through a connection device not shown. Rear wheels 13 are provided at rear portions of the vehicle. A front fender 14 and a rear fender 15 including wheel wells are provided on the upper side of the front wheel 12 and the rear wheels 13 so as to cover the wheels 12, 13. Foot rests 44 and 45, which support the feet of the rider seated astride the rider's seat 4, are provided between the front fender 14 and the rear fender 15.

A fuel pump 16 is contained in the fuel tank 3, and fuel pumped up by the fuel pump 16 is supplied to a fuel injection valve (not shown) through a fuel hose 17. An exhaust pipe 18 led out from the engine 2 to the front side is led around a lateral side of the engine 2 to extend rearwards, and is connected to a muffler 19 disposed on the vehicle rear side. A catalyst 43 for cleaning and removing harmful components contained in the exhaust gas is provided inside the muffler 19. An oxygen concentration sensor 42 is provided in the vicinity of a connection portion of the exhaust pipe 18 for connection with the muffler 19, namely, immediately on the upstream side of the catalyst 43.

The ATV 1 includes a control system for detecting the air-fuel ratio of a air-fuel mixture combusted in the engine 2 based on the concentration of oxygen in the exhaust gas and determining the amount of fuel injected by a fuel injection system based on the detection results (the fuel injection system and the control system are known and are therefore not shown in the figures.) The oxygen concentration sensor 42 is provided for detecting the oxygen concentration in the exhaust gas and supplying the detection results to the control system.

The exhaust pipe 18 is exposed to the exterior at a lateral side of the engine 2, and its portion on the rear side extends into an inside space surrounded by the rear fender 15. Thus, the oxygen concentration sensor 42 is away from the feet of the rider seated astride the rider's seat 4, and is protected by the fender 15. In other words, the oxygen concentration sensor 42 does not project on the upper side of the foot rest 44 and overlap with the foot rest 44. Thus, the oxygen concentration sensor 42 ensures that living-comfort properties (ride comfort) can be secured for the rider and the oxygen concentration sensor 42 is also less likely to be influenced by external forces.

The ATV 1 includes main frames 20 and an under frame 21, and the individual components of the vehicle are supported by the respective frames 20, 21 and pipes or plates such as sub-frames and brackets which are connected to the respective frames 20, 21.

Figure 5:
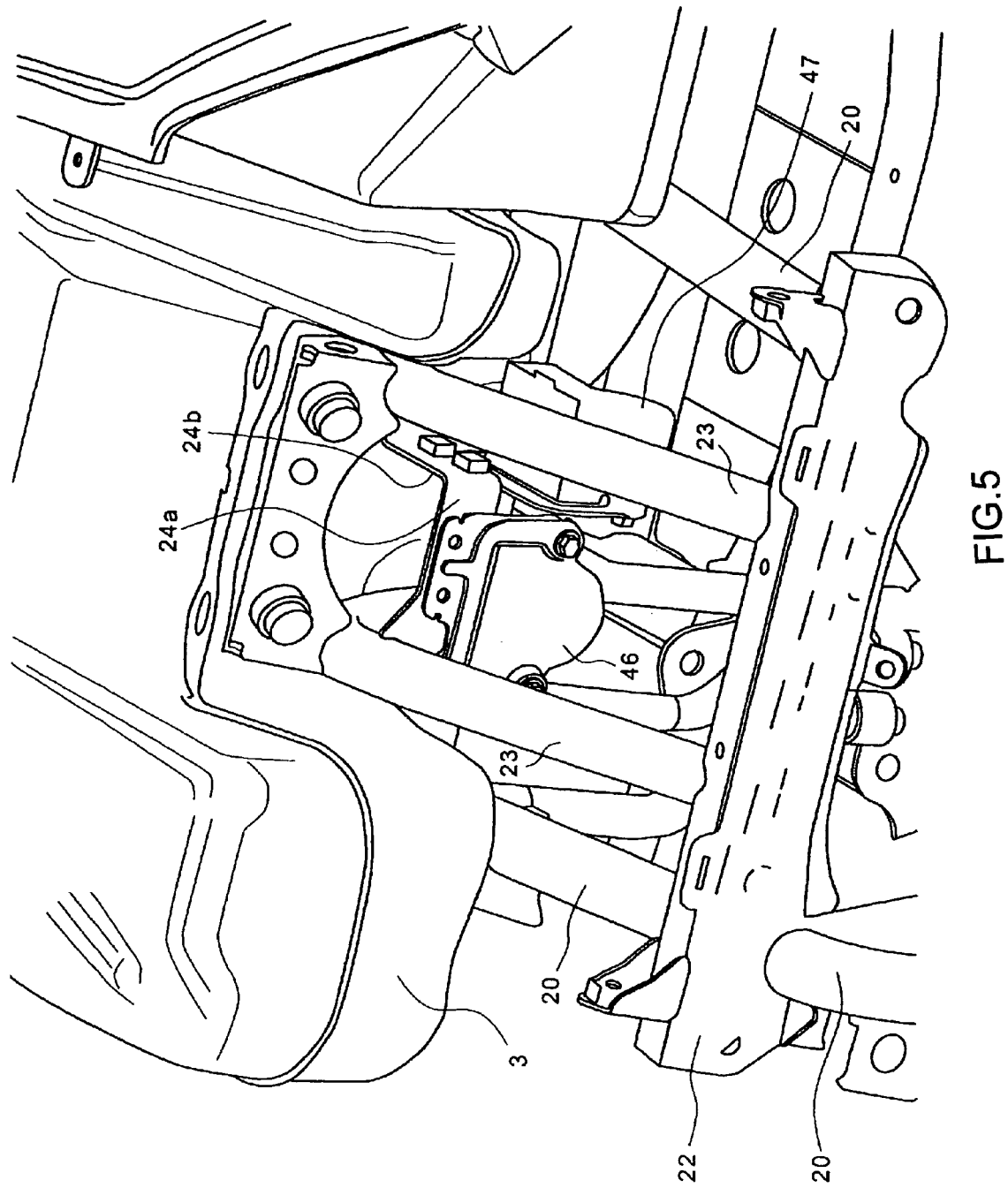
FIG. 5 is a perspective view of an essential part of the ATV according to one embodiment of the present invention.

A tumble sensor system for generating a tumble output when the inclination angle of the vehicle exceeds a reference angle for tumble judgment is provided at a front portion of the ATV 1. The tumble sensor system includes a tumble sensor 46 for detecting a tumble in the left-right direction and a tumble sensor 47 for detecting a tumble in the front-rear direction. FIG. 5 is a perspective view of an essential part of the vehicle body for showing the layout of the tumble sensors 46, 47. The layout of the tumble sensors will be described below, referring principally to FIGS. 4 and 5.

A bar 22 extending in the left-right direction of the vehicle body is joined to the main frames 20, and two sub-frames 23, extending to the vehicle body rear side, are joined to the bar 22. A stay 24 for mounting the sensors is bridgingly disposed between the two sub-frames 23, which is extend into the space formed by the recess of the fuel tank 3. The steering shaft 9 is disposed so as to pass vertically between the stay 24 and the bar 22, between the two sub-frames 23.

The stay 24 includes a mount surface 24*a* for the tumble sensor 46, and a mount surface 24*b* for the tumble sensor 47. The mount surface 24*a* is a surface orthogonal to the traveling direction of the ATV 1, while the mount surface 24*b* is a surface formed along the traveling direction. The tumble sensor 46 is fixed to the mount surface 24*a* by a bolt or the like, and the tumble sensor 47 is fixed to the mount surface 24*b* by a bolt or the like.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention claimed is:

1. A saddle ride type all-terrain vehicle having an engine, a front wheel and rear wheels, a saddle type rider's seat, and a rear fender provided so as to cover the surroundings of said saddle type rider's seat and said rear wheels, said vehicle comprising:
    an exhaust pipe led out to a vehicle body rear side from the engine;
    a muffler connected to said exhaust pipe; and
    an oxygen concentration sensor provided in the vicinity of a connection portion between said exhaust pipe and said muffler, wherein
    said oxygen concentration sensor is located inside the rear fender.

2. A saddle ride type all-terrain vehicle as set forth in claim 1, further comprising:
    a catalyst provided in said muffler, wherein
    said oxygen concentration sensor is disposed immediately upstream of said catalyst.

3. A saddle ride type all-terrain vehicle as set forth in claim 1, further comprising:
    a foot rest for supporting a rider's foot thereon, wherein
    said foot rest is provided on a front side of an outside portion of the rear fender.

4. A saddle ride type all-terrain vehicle as set forth in claim 2, further comprising:
    a foot rest for supporting a rider's foot thereon, wherein
    said foot rest is provided on a front side of an outside portion of the rear fender.

5. A saddle ride type all-terrain vehicle as set forth in claim 1 wherein said oxygen concentration sensor detects an oxygen concentration in an exhaust gas and supplies the detection results to a control system.

6. A saddle ride type all-terrain vehicle as set forth in claim 2 wherein said oxygen concentration sensor detects an oxygen concentration in an exhaust gas and supplies the detection results to a control system.

7. A saddle ride type all-terrain vehicle as set forth in claim 1, wherein:
    said exhaust pipe is exposed to the exterior at a lateral side of the engine; and an exhaust pipe rear side extends into an inside space surrounded by the rear fender.

8. A saddle ride type all-terrain vehicle as set forth in claim 2, wherein:
    said exhaust pipe is exposed to the exterior at a lateral side of the engine; and an exhaust pipe rear side extends into an inside space surrounded by the rear fender.

9. A saddle ride type all-terrain vehicle having an engine, a front wheel and rear wheels, a saddle type rider's seat, and a rear fender provided so as to cover the surroundings of said saddle type rider's seat and said rear wheels, said vehicle comprising:

an exhaust pipe led out to a vehicle body rear side from the engine, wherein said exhaust pipe is exposed to the exterior at a lateral side of the engine, and an exhaust pipe rear side extends into an inside space surrounded by the rear fender;

a muffler connected to said exhaust pipe;

a catalyst provided in said muffler;

a foot rest for supporting a rider's foot thereon, wherein said foot rest is provided on a front side of an outside portion of the rear fender; and an oxygen concentration sensor provided in the vicinity of a connection portion between said exhaust pipe and said muffler, wherein said oxygen concentration sensor is located inside the rear fender, said oxygen concentration sensor is disposed immediately upstream of said catalyst, and said oxygen concentration sensor detects an oxygen concentration in an exhaust gas and supplies the detection results to a control system.

* * * * *